US008288459B2

(12) United States Patent
Iwamoto

(10) Patent No.: US 8,288,459 B2
(45) Date of Patent: Oct. 16, 2012

(54) CORROSION-RESISTANT METAL-REINFORCED COMPOSITES

(75) Inventor: Takashi Iwamoto, Urayasu (JP)

(73) Assignee: Empire Technology Development LLC, Wilmington, DE (US)

(*) Notice: Subject to any disclaimer, the term of this patent is extended or adjusted under 35 U.S.C. 154(b) by 0 days.

(21) Appl. No.: 13/126,155

(22) PCT Filed: Jan. 18, 2011

(86) PCT No.: PCT/US2011/021584
§ 371 (c)(1),
(2), (4) Date: Apr. 26, 2011

(65) Prior Publication Data
US 2012/0184649 A1  Jul. 19, 2012

(51) Int. Cl.
*C04B 24/16* (2006.01)
*C08K 3/26* (2006.01)
(52) U.S. Cl. .................. 524/3; 524/4; 524/6; 524/424
(58) Field of Classification Search ............ 524/3, 4, 524/424, 6
See application file for complete search history.

(56) References Cited

U.S. PATENT DOCUMENTS

| | | | |
|---|---|---|---|
| 3,367,084 A * | 2/1968 | Reiland | 52/649.7 |
| 4,391,946 A | 7/1983 | Akerberg et al. | |
| 4,722,976 A | 2/1988 | Ceska | |
| 4,780,246 A | 10/1988 | Naarmann | |
| 5,491,180 A | 2/1996 | Kiuchi et al. | |
| 5,817,944 A | 10/1998 | Chung | |
| 5,972,518 A | 10/1999 | Epstein et al. | |
| 6,060,116 A * | 5/2000 | Kulkarni et al. | 427/213.3 |
| 6,632,380 B1 * | 10/2003 | Wessling | 252/500 |
| 6,756,123 B2 | 6/2004 | Ha et al. | |
| 7,004,673 B2 | 2/2006 | Sapozhnikov | |
| 7,670,426 B2 | 3/2010 | Gray | |
| 2002/0177003 A1 * | 11/2002 | Myrick | 428/469 |
| 2004/0149963 A1 | 8/2004 | Sinko et al. | |
| 2007/0289502 A1 * | 12/2007 | Destree | 106/644 |

FOREIGN PATENT DOCUMENTS

IN  613/DEL/2007  * 4/2009

OTHER PUBLICATIONS

"Applications of Different Types of Concrete," *Today's Concrete Technology*, downloaded from http://www.todaysconcretetechnology.com/applications-of-different-types-of-concrete.html on Sep. 14, 2010.
ASTM International, "Standard Terminology Relating to Concrete and Concrete Aggregates," Designation: C125-10a (Nov. 2010).

(Continued)

*Primary Examiner* — Ling Choi
*Assistant Examiner* — John Uselding
(74) *Attorney, Agent, or Firm* — Knobbe, Martens, Olson & Bear, LLP

(57) ABSTRACT

Disclosed herein are metal-reinforced composites that can exhibit improved corrosion resistance. In particular, the composites may include a polymer dispersed within a binding medium that can impede or inhibit the corrosive effects caused by certain salts. The composites, for example, can be prepared without departing from standard procedures for preparing the composite. Also disclosed herein are methods of making the composite, corrosion-resistant components of the composite, and methods of making the corrosion-resistant components.

43 Claims, 6 Drawing Sheets

OTHER PUBLICATIONS

R.J.P., "Stop iron and steel from rusting . . . " *Chemtech* 25, No. 6 (Jun. 1995): 63.

DeBerry, David W., "Modification of the Electrochemical and Corrosion Behavior of Stainless Steels with an Electroactive Coating," *J. Electrochem.Soc.*, vol. 132, No. 5, 1022-1026, May 1985.

Odian, G., *Principles of Polymerization*, 3rd ed. Wiley & Sons, Inc. (1991), pp. 172-176.

Saravanan, K., et al., "Performance evaluation of polyaniline pigmented epoxy coating for corrosion protection of steel in concrete environment," *Progress in Organic Coatings*, 59:160-167, May 2007.

Takahashi, H., et al., "Influence of the Water-to-Cement Ratio of Concrete on Chloride Ion Penetration," in Gihodo Shuppan, May 1986.

Thompson, K.G., et al., "Corrosion-Protective Coatings from Electrically Conducting Polymers" (1991).

Yano, et al., "Development and the Educational Effect of a System of the Corrosion of Iron and the Anti-corrosion Ability of Conductive Polymer Polyaniline," *J. of JSEE*, vol. 55, No. 2, pp. 2-37-2-42, (2007).

International Search Report and Written Opinion mailed Feb. 24, 2011 in PCT/US2011/021584.

* cited by examiner

CORROSION-RESISTANT METAL-REINFORCED COMPOSITES

CROSS-REFERENCE TO RELATED APPLICATIONS

This application is the U.S. National Phase under 35 U.S.C. §371 of International Application No. PCT/US2011/021584, filed Jan. 18, 2011. The International Application was filed in English. The contents of the International Application are hereby incorporated by reference in their entirety.

BACKGROUND

1. Field

The present application relates to metal-reinforced composites, such as metal-reinforced concrete, that can exhibit improved resistance to corrosion.

2. Description

In recent years, there has been a growing demand to improve the durability of concrete structures in the fields of civil engineering or construction. Concrete structures in coastal areas are particularly vulnerable to deterioration caused by salt damage. Specifically, chloride ions can neutralize a concrete material, which causes embrittlement and cracking. The chlorine ions may eventually reach internal reinforcing bars and erode passive films on the reinforcing bars. This can cause the reinforcing bars to corrode and the concrete structure may ultimately fail.

Methods to control such salt damage include application of protective coatings, such as zinc or chromium, to the surface of reinforcing bars to enhance their corrosion resistance. Another approach is to make the concrete structure itself resistant to the penetration of chloride ions. For example, one technique includes reducing the water-cement ratio in concrete to impart greater resistance to chorine penetration. This simple approach of reducing the water-cement ratio can deteriorate the concrete's mechanical properties.

Another approach is to coat the surface of a concrete structure with what is called "polymer cement," which can provide improved water-tightness. Nylon or vinyl chloride are examples of polymers that may be used to prevent chloride ions from entering the concrete. The polymer cement coating, however, exhibits problems, such as peeling when exposed to elevated temperatures or physical stress (e.g., friction). Also, the polymer coatings require an additional process step to apply the material onto the concrete structure. Thus, the polymer coating requires increased time and expense, while still providing poor cost performance.

SUMMARY

Some embodiment disclosed herein include a corrosion-resistant, metal-reinforced composite including: a binding medium; a granular material dispersed within the binding medium; a polymer dispersed within the binding medium, wherein the polymer comprises a recurring unit having a n-conjugated electron system; and a metal reinforcing member embedded within the binding medium.

In some embodiments, the polymer is configured to be electrically conductive when doped with an effective amount of dopant. In some embodiments, the dopant is a hydrochloride. In some embodiments, the polymer is configured to have an electrical conductivity of at least $10^{-2}$ S·cm$^{-1}$ when doped with an effective amount of dopant. In some embodiments, the polymer is not doped.

In some embodiments, the recurring unit is selected from the group consisting of:

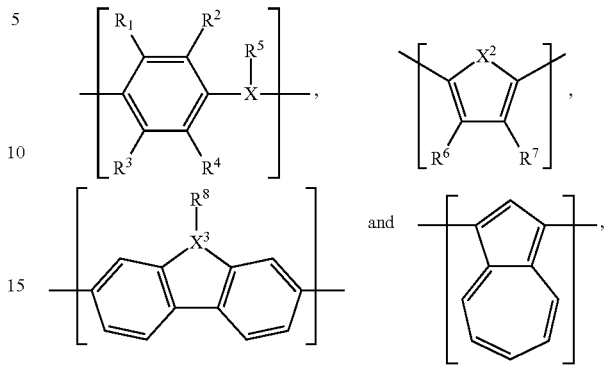

wherein:

$X^1$, $X^2$ and $X^3$ are each independently selected from the group consisting of O, S, and N; $R^1$ and $R^2$, are each independently selected from the group consisting of hydrogen, $C_{1-6}$ alkyl and $C_{1-6}$ alkoxy, or $R^1$ and $R^2$ are taken together to form a cycloalkyl, aryl or heterocycle; $R^3$ and $R^4$ are each independently selected from the group consisting of hydrogen, $C_{1-6}$ alkyl and $C_{1-6}$ alkoxy, or $R^3$ and $R^4$ are taken together to form a cycloalkyl, aryl or heterocycle; $R^6$ and $R^7$ are each independently selected from the group consisting of hydrogen, $C_{1-6}$ alkyl and $C_{1-6}$ alkoxy, or $R^6$ and $R^7$ are taken together to form a cycloalkyl, aryl or heterocycle; $R^5$ is absent or selected from the group consisting of hydrogen and $C_{1-6}$ alkyl; and $R^8$ is absent or selected from the group consisting of hydrogen and $C_{1-6}$ alkyl.

In some embodiments, the polymer is selected from the group consisting of polyaniline, polyoxyphenylene, polyphenylene sulfide, polythiophene, polyfuran, polypyrrole, polymethylpyrrole, polycarbozole, polyazulene, and copolymers thereof.

In some embodiments, the composite comprises at least 0.001% of the polymer by weight. In some embodiments, the composite comprises no more than about 35% of the polymer by weight.

In some embodiments, the polymer is coated on at least a portion of the granular material dispersed within the binding medium. In some embodiments, the polymer coating on at least a portion of the granular material is about 20 μm to about 200 μm thick.

In some embodiments, the polymer is a powder.

In some embodiments, the composite comprises at least about 4% of the binding medium by weight. In some embodiments, the composite comprises no more than about 50% of the binding medium by weight.

In some embodiments, the binding medium is selected from the group consisting of a binding polymer, cement, and mixtures thereof, wherein the binding polymer is not the same as the polymer dispersed in the binding medium.

In some embodiments, the composite comprises at least about 40% of the granular material by weight. In some embodiments, the composite comprises no more than about 90% of the granular material by weight.

In some embodiments, the granular material is aggregate. In some embodiments, the granular material comprises at least 10% by weight of a first material that is retained by a 4.75-mm sieve. In some embodiments, the granular material comprises at least 10% by weight of a second material that passes through a 4.75-mm sieve. In some embodiments, the granular material is selected from the group consisting of sand, gravel, stone, crushed stone, iron blast-furnace slag, and combinations thereof.

In some embodiments, the metal reinforcing member is configured to carry tensile loads within the composite. In some embodiments, the metal reinforcing member comprises a plurality of metal bars having diameters of at least about 4 mm. In some embodiments, the metal bars are at least about 25 cm long. In some embodiments, the metal bars comprise a plurality of ridges along a surface of the metal bars. In some embodiments, the metal reinforcing member is steel or stainless steel.

In some embodiments, the composite further comprises fibers. In some embodiments, at least of a portion of the fibers are coated with the polymer.

Some embodiments include a method of making a corrosion-resistant, metal-reinforced composite, the method comprising: combining a binding medium, a granular material, and a polymer to form a mixture; embedding a metal reinforcing member within the mixture; and curing the mixture to form a rigid composite, wherein the polymer comprises a recurring unit having a π-conjugated electron system.

In some embodiments, the recurring unit is selected from the group consisting of:

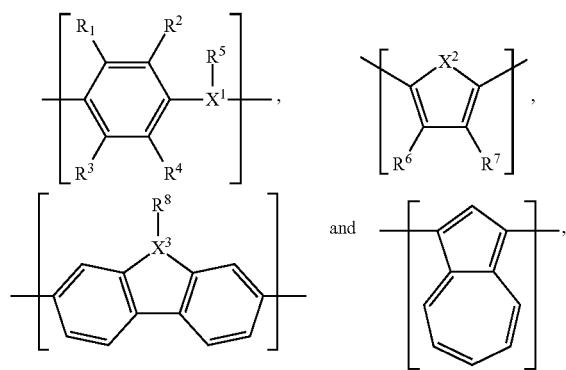

wherein:

$X^1$, $X^2$ and $X^3$ are each independently selected from the group consisting of O, S, and N; $R^1$ and $R^2$, are each independently selected from the group consisting of hydrogen, $C_{1-6}$ alkyl and $C_{1-6}$ alkoxy, or $R^1$ and $R^2$ are taken together to form a cycloalkyl, aryl or heterocycle; $R^3$ and $R^4$ are each independently selected from the group consisting of hydrogen, $C_{1-6}$ alkyl and $C_{1-6}$ alkoxy, or $R^3$ and $R^4$ are taken together to form a cycloalkyl, aryl or heterocycle; $R^6$ and $R^7$ are each independently selected from the group consisting of hydrogen, $C_{1-6}$ alkyl and $C_{1-6}$ alkoxy, or $R^6$ and $R^7$ are taken together to form a cycloalkyl, aryl or heterocycle; $R^5$ is absent or selected from the group consisting of hydrogen and $C_{1-6}$ alkyl; and $R^8$ is absent or selected from the group consisting of hydrogen and $C_{1-6}$ alkyl.

In some embodiments, the polymer is selected from the group consisting of polyaniline, polyoxyphenylene, polyphenylene sulfide, polythiophene, polyfuran, polypyrrole, polymethylpyrrole, polycarbozole, polyazulene, and copolymers thereof.

In some embodiments, the combining further comprises combining water with the granular material, the binding medium, and the polymer. In some embodiments, the polymer is combined with the water before combining with the granular material and the binding medium.

In some embodiments, the polymer is applied on at least a portion of the granular material before combining with the binding medium. In some embodiments, the polymer is applied to form a layer about 20 μm to about 200 μm thick on at least a portion of the granular material.

Some embodiments disclosed herein include a composite prepared according any of the methods described herein.

Some embodiments disclosed herein include a method of applying a polymer to an aggregate, the method comprising: providing an aggregate selected from the group consisting sand, gravel, stone, crushed stone, iron blast-furnace slag, and combinations thereof; providing a solution of one or more monomer units; dispersing the aggregate in the solution to form a dispersion; and polymerizing the one or more monomer units to produce a polymer; wherein: the polymer comprises a recurring unit having a n-conjugated electron system. In some embodiments, the dispersion comprises at least about equal parts by weight of aggregate to the one or more monomer units.

Some embodiments disclosed herein include a composition comprising an aggregate coated with a polymer; wherein: the polymer comprises a recurring unit having a n-conjugated electron system; and the aggregate is selected from the group consisting sand, gravel, stone, crushed stone, iron blast-furnace slag, and combinations thereof.

Some embodiments disclosed herein include applying a solution to an aggregate to form a polymer layer on the aggregate, wherein: a polymer is dispersed within the solution; the polymer comprises a recurring unit having a π-conjugated electron system; and the aggregate is selected from the group consisting sand, gravel, stone, crushed stone, iron blast-furnace slag, and combinations thereof.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1A:
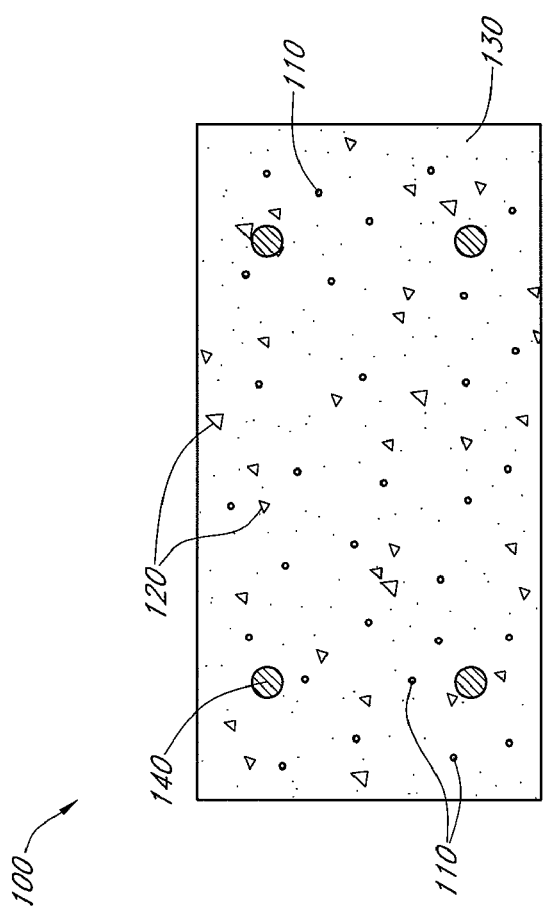
FIG. 1A depicts an illustrative embodiment of cross-sectional view of a metal-reinforced composite within the scope of the present application (not to scale).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Disclosed herein are metal-reinforced composites that can exhibit improved corrosion resistant. In particular, the composites may include a polymer dispersed within a binding medium that can impede or inhibit the corrosive effects caused by certain salts. The composites, for example, can be prepared without departing from standard procedures for preparing the composite. Also disclosed herein are methods of making the composite, corrosion-resistant components of the composite, and methods of making the corrosion-resistant components.

Unless otherwise specifically noted herein, the terms set forth below will have the following definitions.

The term "$C_{1-6}$ alkyl" as used herein means acyclic, straight or branched chain alkyl substituents having one to six carbon atoms and includes, for example, methyl, ethyl, propyl, butyl, tert-butyl, hexyl, 1-methylethyl, 1-methylpropyl, 2-methypropyl, 1,1-dimethylethyl.

The term "$C_{1-6}$ alkoxy" as used herein means an alkyl group with one to six carbon atoms attached to an oxygen atom. Alkoxy includes, for example, methoxy, ethoxy, propoxy, 1-methylethoxy, butoxy and 1,1-dimethylethoxy.

The term "cycloalkyl" as used herein means a cycloalkyl substituent containing three to nine carbon atoms and includes, for example, cyclopropyl, cyclobutyl, cyclopentyl, cyclohexyl, cycloheptyl and spiro cyclic groups such as spirocyclopropyl as spirocyclobutyl.

The term "heterocycle" used herein means 7-12 membered bicyclic heterocycles and 5-7 membered monocyclic heterocycles. Some embodiments of bicyclic heterocycles are 7-12 membered fused bicyclic ring systems (both rings share an adjacent pair of atoms) containing from one to four heteroatoms selected from nitrogen, oxygen and sulfur, wherein both rings of the heterocycle are fully unsaturated. Some embodiments of monocyclic heterocycles are 5-7 membered saturated, partially saturated or fully unsaturated ring system (this latter subset also herein referred to as unsaturated heteroaromatic) containing in the ring from one to four heteroatoms selected from nitrogen, oxygen and sulfur, wherein the sulfur and nitrogen heteroatoms may be optionally oxidized.

Metal-Reinforced Composites

Figure 1B:
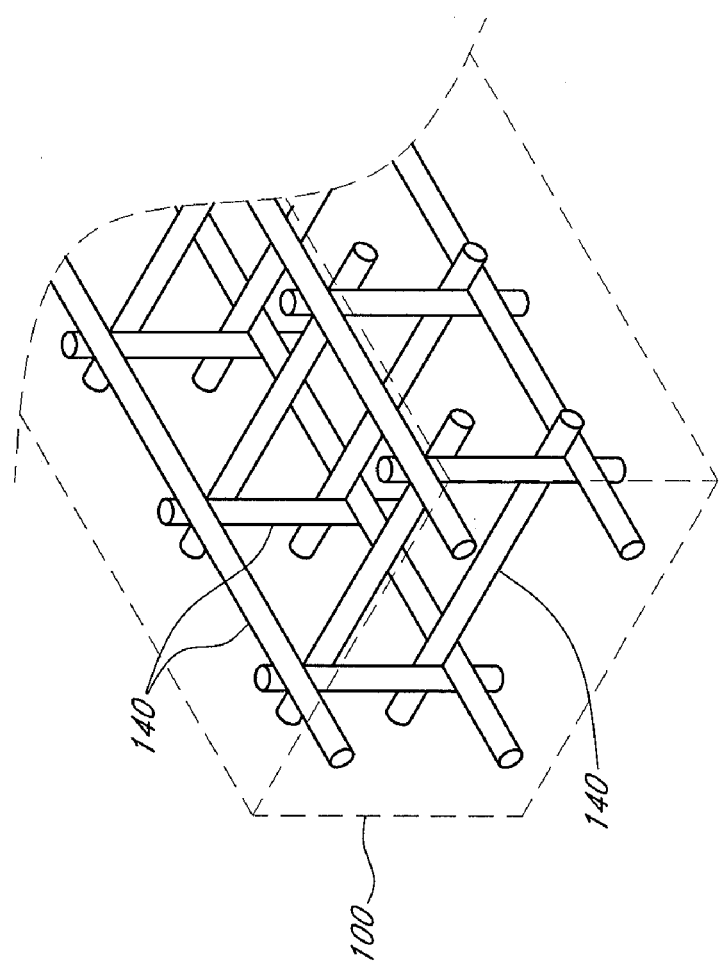
FIG. 1B depicts a perspective view of the metal reinforcing member embedded within the metal-reinforced composite of FIG. 1A.

FIG. 1A is a cross-sectional view which represents one embodiment of the composites of the present application. Composite 100 includes polymer 110 and granular medium 120 dispersed within binding medium 130. As discussed further below, polymer 110 can be a polymer that provide improves corrosion resistance. Binding medium 130 can, for example, provide adhesion between other components in composite 100 to maintain a generally solid composite. Granular medium 120 can be, for example, a material configured to carry compressive loads. Metal reinforcing member 140 is fully or partially embedded within binding medium 130 and, in some embodiments, is configured to carry tensile loads. FIG. 1B depicts a perspective view of the metal reinforcing member 140 embedded in composite 100. (Only metal reinforcing member 140 is show in FIG. 1B for clarity.)

Thus, as depicted in FIG. 1B, metal reinforcing member 140 can include a network of bars extending in two or all three dimensions. In some embodiments, composite 100 includes concrete.

The binding medium is not particularly limited and may, in some embodiments, be any material that provides sufficient adhesion between the various components (e.g., the granular material and polymer) in the composite. Thus, for example, the binder may sufficiently adhere the components to form a generally solid composite. For example, the binding medium, or its precursor, may allow the composite to flow until it is cured to adhere the components together into a solid. The binding medium may be, in some embodiments, configured such that the composite after curing exhibits a penetration resistance of at least 500 psi, at least 1000 psi, at least 2000 psi, at least 3000 psi, or at least 4000 psi. The penetration resistance can be readily determined according to ASTM C 403.

In some embodiments, the binding medium includes a binding polymer. For example, the binding polymer may be a thermoplastic or thermosetting polymer that can be initially a liquid before curing the material into a solid. The binding polymer may be cured by various means, such as by cross-linking an existing polymer or polymerizing monomer units (or lower molecular weight polymers). As one example, the binding medium may be an epoxy, where the precursor materials for the epoxy (e.g., bisphenol-A and epichlorohydrin) can be mixed with other components. The precursor materials can be polymerized to form the binding medium and harden the composite. As another example, the binding medium may be a photo-polymerizable polymer, such as an acrylic. Monomer units can be combined with other components in the composite and exposed to radiation to polymerize the monomers into an acrylic polymer. The acrylic forms the binding medium and adheres the components within the composite.

Of course, many other possible polymers can be used as the binding medium and are within the scope of the present application. In some embodiments, if the binding medium includes a binding polymer, the binding polymer is different from the polymer dispersed in the binding medium.

In some embodiments, the binding medium includes cement. As used herein, the term "cement" is intended to include its generally understood meaning for concrete materials (see ASTM C125-10A). The cement may be a hydraulic cement or non-hydraulic cement. That is, the cement may or may not require hydrating with water in order to cure the binding medium. Portland cement, and its many related blends, is one example of cement that can be included in the composites of the present application.

The binding medium may also be a mixture of two or more components. For example, the binding medium may be a mixture of a binding polymer and cement (e.g., epoxy and Portland cement). The binding medium can include, for example, at least 30% by weight cement, at least 50% by weight cement, at least 70% by weight cement, at least 80% by weight cement, at least 90% by weight cement, or at least 95% by weight cement. The binding medium can include, for example, at least 10% by weight binding polymer, at least 20% by weight binding polymer, at least 30% by weight binding polymer, at least 40% by weight binding polymer, at least 50% by weight binding polymer, or at least 80% by weight binding polymer.

The amount of binding medium in the composite is not particularly limited and will be selected based on the particular binding medium and other components in the composite. Thus, in some embodiments, the composite includes an amount of binding medium that is effective to form a solid composite (e.g., the composite does not flow under applied pressure). For example, the amount of binding medium may be an effective amount such that, after curing, the composite exhibits a penetration resistance of at least 500 psi, at least 1000 psi, at least 2000 psi, at least 3000 psi, or at least 4000 psi. The composite may include, for example at least about 4% by weight, at least about 10% by weight, at least about 15% by weight, at least about 20% by weight, or at least about 25% by weight binding medium. The composite may also include, for example, no more than about 50% by weight, no more than about 45% by weight, no more than about 40% by weight, no more than about 35% by weight, or no more than about 30% by weight binding medium. In some embodiments, the composite includes about 4% by weight to about 50% by weight binding medium.

The granular material is also not particularly limited and can be selected based upon the desired properties of the composite. In some embodiments, the granular material is configured to carry compressive loads. The granular material may therefore be any material with sufficient compressive strength. For example, the granular material may exhibit a compressive strength of at least about 1000 psi (about 7000 KPa), at least about 2000 psi (about 14,000 kPa), at least about 3000 psi (about 21,000 kPa), at least about 5000 psi (about 34,000 kPa), or at least about 6000 psi (about 41,000 kPa). The granular material may, in some embodiments, be selected from sand, gravel, stone, crushed stone, iron-blast furnace slag, and combinations thereof.

In some embodiments, the granular material is aggregate. As used herein, the term "aggregate" is intended to include its generally understood meaning for concrete materials (see e.g., ASTM C125-10A).

The size of the granular material can vary based upon the desired properties for the composite and the method of preparing the composite. The granular material may include a proportion of aggregate below a certain size. For example, a proportion of the granular material may be no more than a maximum size of about 100 mm, about 50 mm, about 40 mm, about 30 mm, or about 20 mm. The proportion below the maximum size may be at least 50%, at least 75%, at least 90%, at least 95%, or at least 99%, or at least 99.9% of the total amount of aggregate by weight.

The total amount of granular material in the composite will vary. In some embodiments, the total amount of granular material is in the range of about 40% to about 90% by weight. The total amount of granular material may, for example, be at least about 40%, at least about 50%, at least about 60%, or at least bout 70% by weight of the composite. The total amount of granular material may, for example, be no more than about 90% by weight, no more than about 80% by weight, or no more than about 70% by weight of the composite.

In some embodiments, the average size of the granular material may be within the range of about 10 µm to about 100 mm. The average size of the granular material may be, for example, at least 10 µm, at least 100 µm, at least 500 µm, at least 1 mm, at least 3 mm, at least 5 mm, or at least 10 mm. The average size of the granular material may be, for example, no more than about 50 mm, no more than about 40 mm, no more than about 20 mm, no more than about 10 mm, no more than about 5 mm, or no more than about 1 mm.

Typically, when the granular material is used to form concrete, the granular material may include both coarse and fine granular materials (e.g., course and fine aggregate). A fine granular material passes through a 4.75-mm sieve. A course granular material is retained by a 4.75-mm sieve. The granular material may, in some embodiments, include at least about 10% by weight of fine aggregate, at least about 20% by weight of fine aggregate, at least about 30% by weight of fine aggregate, at least about 40% by weight of fine aggregate, or at least about 50% by weight of fine aggregate. The granular material may, in some embodiments, include at least about 10% by weight of coarse aggregate, at least about 20% by weight of coarse aggregate, at least about 30% by weight of coarse aggregate, at least about 40% by weight of coarse aggregate, or at least about 50% by weight of coarse aggregate.

In addition to the binding medium and granular material, the composite can include a metal-reinforcing member disposed or fully or partially embedded within the binding medium. Typically, the metal-reinforcing member will be configured to carry tensile loads that may be applied to composite. For example, the metal reinforcing member may include one or a plurality of metal bars that extend in one or more dimensions (e.g., one, two, or three directions) of the composite (e.g., as depicted in FIGS. 1A-B). The two or more of the bars may have interlocking loops so that tensile forces are transferred between the two or more bars. The metal-reinforcing member can include any metal (or alloy) and can be selected based upon the intended use. As one example, the metal-reinforcing member may include steel or stainless steel when high tensile loads are expected (e.g., rebar commonly used in reinforced concrete).

In some embodiments, the metal-reinforcing member is one or more metal bars (e.g., one, two, three, or more metal bars) disposed within the composite. The metal bars can have diameters, in some embodiments, in the range of about 4 mm to about 100 mm. The metal bars can have diameters, for example, of at least 4 mm, at least about 8 mm, at least about 12 mm, at least about 20 mm, at least about 30 mm, or at least about 40 mm. The metal bars can have diameters, for example, of no more than about 100 mm, no more than about 80 mm, no more than about 60 mm, no more than about 50 mm, no more than about 40 mm, or no more than about 30 mm.

The length of the metal bars is not particularly limited. In some embodiments, at least a portion of the metal bars have a length, for example, of at least about 25 cm, at least about 50 cm, at least about 1 m, at least about 2 m, at least about 5 m, or at least about 10 m. The metal bars may also comprise a plurality of engaging members along a portion, or substantially all, of the surface. The engaging members can be configured to engage the surrounding composition (e.g., granular material, binding medium, polymer, and so on) to inhibit the metal bars from moving relative to the surrounding composition. For example, the metal bars can include ridges along the surface of the metal bars that engage the surrounding composition and inhibit motion.

As discussed in the background above, metal-reinforcing members can be susceptible to corrosion due to exposure to certain salts, including chloride-ion containing salts. The composites of the present application include a polymer dispersed within the binding medium that can impede or inhibit the corrosive effects caused by certain salts. In some embodiments, the polymer comprises a recurring unit having a π-conjugated electron system. That is, the recurring unit (or its combination with two or more recurring units) includes π-orbitals with delocalized electrons. 1,3 pentadiene and furan are two non-limiting examples of compounds with a π-conjugated electron system. In some embodiments, the polymer has a π-conjugated electron system along the main chain (or backbone) of the polymer. Polyaniline is one example of a polymer with a π-conjugated electron system along the main chain.

The polymer may, in some embodiments, be an electrically conductive polymer. For example, the polymer may be conductive when doped with an effective amount of dopant. Non-limiting examples of conductive polymers include polyaniline, polyoxyphenylene, polyphenylene sulfide, polythiophene, polyfuran, polypyrrole, polymethylpyrrole, polycarbozole, polyazulene, and copolymers thereof. In some embodiments, the polymer is the emeraldine-base form of polyaniline. The dopant can be, for example, a hydrochloride (e.g., hydrochloric acid) or various other protonic acids that oxidize the polymer unit. The effective amount of dopant can be readily determined by those of ordinary skill. As one example, exposing polyaniline to 1M HCl solution can produce an electrically conductive polymer. The doped polymer can, in some embodiments, exhibit an electrical conductivity of at least about $10^{-2}$ S·cm$^{-1}$, at least about $10^{-1}$ S·cm$^{-1}$, at least about 1.0 S·cm$^{-1}$, or at least about 2.0 S·cm$^{-1}$ when doped with an effective amount of dopant.

Many of the polymers described herein are commercially available. For example, polyaniline and polypyrrole are commercially available from Kaken Industry Co., Ltd. Also, many of the conductive polymers disclosed herein may be prepared by electrochemical polymerization. See, for example, Odian, G. *Principles of Polymerization*, 3$^{rd}$ ed. Wiley & Sons, Inc. (1991), pp. 172-176. The polymer can be isolated from the polymerization reaction and optionally further processed before dispersing in the binding medium. For example, the polymer can be subjected to comminution (e.g., grinding or cutting) to obtain a granular form, such as a powder. As another example, the polymer may be dispersed within a solvent. In some embodiments, the polymer is exposed to a base to obtain the non-doped form of the polymer that does not electrically conduct. In some embodiments, the polymer is polyaniline and exposed to a base to obtain an emeraldine-base for of polyaniline.

In some embodiments, the polymer is not doped when dispersed in the binding medium. That is, the polymer is not electrically conductive when dispersed in the composite but may become electrically conductive upon doping (e.g., after exposure to chloride ions). One example of a method for forming the non-doped polymer includes exposing the polymer to base. For example, polyaniline may be exposed to an alkali alkoxide or ammonium to yield non-doped polyaniline that is not conductive. The non-doped polymer may, in some embodiments, exhibit an electrical conductivity of no more than about $10^{-6}$ S·cm$^{-1}$, no more than about $10^{-4}$ S·cm$^{-1}$, no more than about $10^{-3}$ or no more than about $10^{-2}$ S·cm$^{-1}$.

Without being bound to any particular theory, it is believed that polymers having a π-conjugated electron system can inhibit salts from penetrating the concrete and corroding the metal-reinforcing member. For example, hydrochloride salts can react with (e.g., oxidize) the π-conjugated electron system before reaching the metal-reinforcing member. Another potential advantage is the electrical conductivity that the polymer may exhibit in some embodiments. The polymer may, for example, exhibit conductivity after being oxidized by the hydrochloride salt. The conductive polymers may then form an electric dipole with the metal reinforcing member that opposes the flow of electrons from the metal to an oxidizing species. Accordingly, some embodiments of the composites disclosed herein provide at least two mechanisms for inhibiting corrosion: (i) inhibiting oxidizing species from penetrating the composite, and (ii) providing an electrically conductive surrounding that opposes the flow of electrons from the metal to an oxidizing species.

Some embodiments of the polymer include a recurring unit selected from the group consisting of:

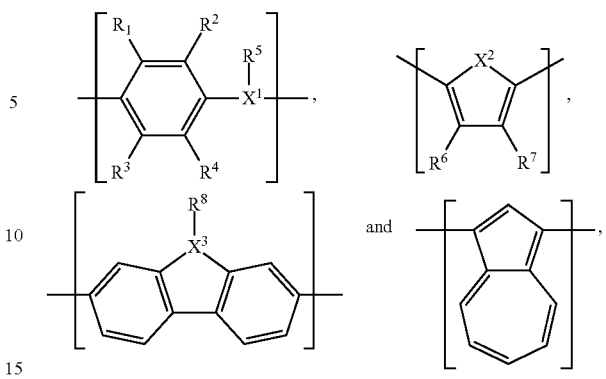

where: $X^1$, $X^2$ and $X^3$ are each independently selected from the group consisting of O, S, and N; $R^1$ and $R^2$, are each independently selected from the group consisting of hydrogen, $C_{1-6}$ alkyl and $C_{1-6}$ alkoxy, or $R^1$ and $R^2$ are taken together to form a cycloalkyl, aryl or heterocycle; $R^3$ and $R^4$ are each independently selected from the group consisting of hydrogen, $C_{1-6}$ alkyl and $C_{1-6}$ alkoxy, or $R^3$ and $R^4$ are taken together to form a cycloalkyl, aryl or heterocycle; $R^6$ and $R^7$ are each independently selected from the group consisting of hydrogen, $C_{1-6}$ alkyl and $C_{1-6}$ alkoxy, or $R^6$ and $R^7$ are taken together to form a cycloalkyl, aryl or heterocycle; $R^5$ is absent or selected from the group consisting of hydrogen and $C_{1-6}$ alkyl; and $R^8$ is absent or selected from the group consisting of hydrogen and $C_{1-6}$ alkyl.

In some embodiments, $X^1$ is N. In some embodiments, $X^2$ is N. In some embodiments, $X^2$ is S. In some embodiments, $X^3$ is N. In some embodiments, $R^1$, $R^2$, $R^3$, $R^4$, $R^5$, $R^6$, $R^7$, and $R^8$ are all hydrogen.

The polymer can include one or more of the recurring units disclosed above (e.g., a recurring unit with a n-conjugated electron system). Thus, the polymer can include a minimum amount of the recurring units in the polymer, for example, at least about 30% by weight, at least about 50% by weight, at least about 60% by weight, at least about 70% by weight, at least about 80% by weight, at least about 90% by weight, at least about 95% by weight, at least about 99% by weight, or at least about 99.9% by weight. As one non-limiting example, the polymer may include at least about 90% by weight of a recurring unit represented by the formula:

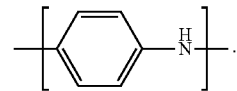

The polymer can be a homopolymer or a copolymer (e.g., includes two or more of the recurring units described herein). The copolymer can be, for example, a random copolymer, a block copolymer, a comb polymer, and the like.

The molecular weight of the polymer in the composite is also not particularly limited. The polymer may have, for example, a weight average molecular weight of at least 1,000 Da, at least about 10,000 Da, at least about 25,000 Da, at least about 50,000 Da, or at least about 100,000 Da. The polymer may have, for example, a weight average molecular weight of no more than about 2 million Da, no more than about 1 million Da, no more than about 500,000 Da, no more than about 200,000 Da, no more than about 100,000 Da, or no more than about 80,000 Da.

The amount of the polymer in the composite will also vary. In some embodiments, the amount of polymer is effective to increase the corrosion-resistance of the metal-reinforcing member. That is, the amount of polymer is sufficient so that the degree of corrosion in metal-reinforcing member can be decreased relative to a similar composite without the polymer. Is some embodiments, the amount of polymer is sufficient so that the dispersed polymer remains in constant contact for form a continuous network or matrix. This may include conductive polymers that, upon doping, create an electric field that inhibits chloride ions from reacting with the metal-reinforcing member.

The amount of the polymer in the composite may, for example, be at least about 0.001% by weight, at least about 0.01% by weight, at least about 0.1% by weight, at least about 1% by weight, at least about 2% by weight, or at least about 5% weight. The amount of the polymer in the composite may, for example, be no more than about 35% by weight, no more than about 25% by weight, no more than about 15% by weight, no more than about 10% by weight, no more than about 5% by weight, no more than about 1% by weight, no more than about 0.5% by weight, or no more than about 0.2% by weight. In some embodiments, the amount of polymer in the composite ranges from about 0.001% to about 35%.

The polymer may be dispersed within the binding medium; however, the present application is not particularly limited in how the polymer is dispersed within the binding medium. Various embodiments are disclosed herein, but others will be readily apparent to the skilled artisan and are within the scope of the present application.

In some embodiments, the polymer is a granular (e.g., powder) and dispersed within the binding medium. For example, as discussed later in the application, the powder can be combined (e.g., intermixed) with the binding medium, and optionally the granular material, before curing. Thus, the polymer may be granular and dispersed with the binding medium and the granular material. In some embodiments, the polymer is granular and has an average size of no more than 10 mm, no more than 5 mm, no more than 1 mm, no more than 500 μm, or less.

In some embodiments, the polymer is disposed within a layer on the surface of the granular material that is dispersed within binding medium. For example, as discussed later in the application, the polymer can be applied (e.g., coated) onto the granular material by contacting the granular material with a solvent containing the polymer. The polymer may then be simultaneously dispersed within the binding medium with the polymer-coated granular material. The polymer layer may cover substantially all of the surface area of the granular material, or only a portion. The polymer layer can be in the range of about 20 μm to about 200 μm thick; however, other thicknesses are possible.

All, or a portion, of the total amount of granular material may have the polymer layer. For example, about 30% of the granular material includes the polymer layer. In some embodiments, the polymer is only applied to coarse granular material. In some embodiments, the polymer is only applied to fine granular material.

In some embodiments, the composite can include fibers dispersed within the binding medium. These fibers can be different from the metal reinforcing member. The fibers may, for example, include zirconium materials, carbon, steel, stainless steel, fiberglass, or various polymers, such as, polypropylene, nylon, polyethylene, polyester, rayon, aramids, or combinations thereof. In some embodiments, the fibers are non-metallic. In some embodiments, the fibers are metallic. In some embodiments, the fibers include anti-alkali glass fibers (ARG). For example, the glass fibers may be bundles of 50 or more strands, where each strand is about 13.5 μm in diameter, and the bundles are about 13 mm in length. The fibers may have an aspect ration of at least 10 (e.g., an aspect ration of about 20). In some embodiments, the composite may include about 1% to about 10% by weight of fiber.

The size of the fibers dispersed in the binding medium is not particularly limited; however, the fibers may, in some embodiments, be smaller than the metal reinforcing member (e.g., rebar). The fibers may, for example, have an average diameter less than about 2 mm, less than about 1 mm, less than about 750 μm, or less than about 500 μm. The fibers may, for example, have an average length less than about 10 cm, less than about 5 cm, less than about 3 cm, or less than about 2 cm.

In some embodiments, the polymer (e.g., polyaniline) may be applied (e.g., coated) to the surface of the fiber. Thus, the polymer can be dispersed in the binding medium at the same time as the fiber. Any of the fiber materials disclosed above can have the polymer applied to its surface. The polymer can be applied to the fiber using the same techniques as for the coating the granular material. For example, the fiber may be exposed to a solution that includes the polymer to form polymer-coated fibers.

In some embodiments, a portion of the polymer is granular and dispersed in the binding medium, and a portion of the polymer is disposed within a layer on the surface of the granular material. In some embodiments, a portion of the polymer is granular and dispersed in the binding medium, and a portion of the polymer is disposed within a layer on the surface of the fibers. In some embodiments, a portion of the polymer is disposed within a layer on the surface of the granular material and a portion of the polymer is disposed within a layer on the surface of the fibers. In some embodiments, a portion of the polymer is granular and dispersed in the binding medium, a portion of the polymer is disposed within a layer on the surface of the granular material, a portion of the polymer is disposed within a layer on the surface of the fibers.

It is also within the scope of the present application to include other components in the composite intended to inhibit corrosion of the metal reinforcing member. For example, the metal reinforcing member may include a coating that inhibits corrosion, such as nickel, zinc, chromium, galvanizing, epoxy, and the like. In some embodiments, the metal reinforcing member is not coated with any polymer that inhibits corrosion. In some embodiments, the metal-reinforcing member is not coated with any polymer. In some embodiments, the metal-reinforcing member is not coated with any non-metallic material.

As would be appreciated by the skilled artisan, various other components may be included without departing from the scope of the present application. For example, the composites may also include fillers or porous regions. Thus, the various components described in this application is not intended to be exhaustive and other, non-listed components are expressly permitted.

Some embodiments of the composites disclosed herein are directed to concrete. It is therefore within the scope of the present application to include various other components in the composite that are commonly included in concrete. Non-limiting example of additional components include viscosity modifiers, corrosion inhibitors, pigments, wetting agents, water-soluble polymers, strength enhancing agents, rheology modifying agents, water repellents, fibers, permeability reducers, pumping aids, fungicidal admixtures, germicidal admixtures, insecticidal admixtures, finely divided mineral admixtures, alkali reactivity reducer, bonding admixtures, and any other admixtures or components that do not adversely affect the corrosion-resistant properties of the composite. U.S. Pat. No. 7,670,426 discloses many common components in concrete, as well as basic procedures for preparing concrete.

The composition of the present application may be particularly advantageous in structures that may be exposed to salt water. For example, structures near coastal areas. Non-limiting examples of structures that can include the compositions disclosed herein include bridges, bridge piling, tunnels, sea walls, retaining walls, docks, ships, barges, roads, walkways, offshore platforms (e.g., oil rigs), and the like.

Methods for Making the Metal-reinforced Composites

Also disclosed herein are methods of making the corrosion-resistant, metal-reinforced composites. Some embodiments of the methods disclosed herein are advantageous because they can prepare the corrosion-resistant composites without specialized equipment or techniques that may increase the costs of making the composites.

Figure 2:
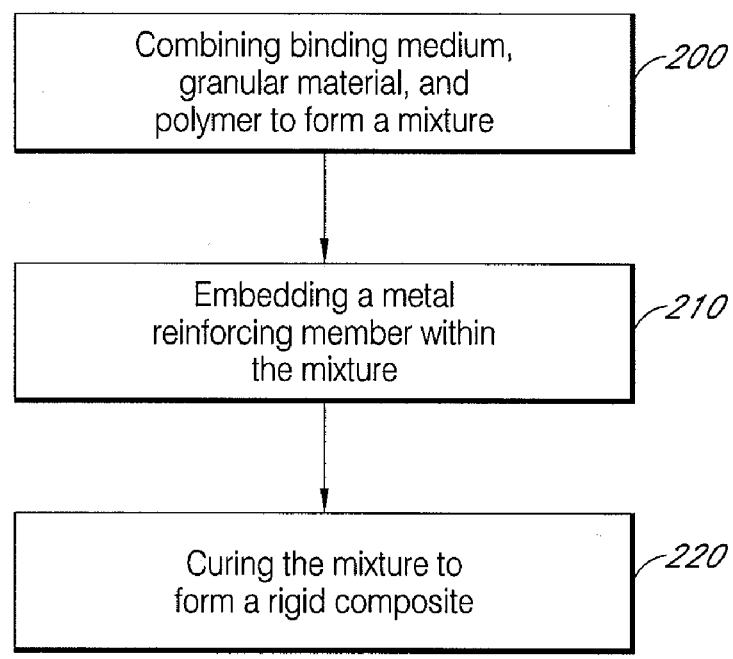
FIG. 2 depicts an illustrative embodiment of a method of making the metal-reinforced composite within the scope of the present application.

Some embodiments of the methods disclosed herein are depicted in FIG. 2. At step 200, a binding medium, granular material, and polymer are combined to form a mixture. The binding medium, granular material, and polymers may be any of those discussed above with respect to the composite. For example, the binding medium may be concrete, the granular material may crushed stone, and the polymer may be polythiophene. Other components can also be combined during step 200, such as water or any other the components discussed above with respect to the composite. The materials may be mixed together using, for example, a concrete mixer. In some embodiments, the components are combined to obtain a generally uniform mixture. In some embodiments, water is combined with the binding medium, granular material, and polymer. The order of combining the components is not particularly limited and any order is within the scope of the present application.

As described above, there are various embodiments for how the polymer is dispersed in the binding medium. Thus, the materials in the mixture may be combined in different ways depending upon the type of dispersion. In some embodiments, a granular form of the polymer is combined with the other components (e.g., admixtures). The granular polymer may then be dispersed with the other components, for example, by mixing.

In some embodiments, the polymer is dispersed or dissolved in a solvent that is then combined with the binding medium. For example, the polymer may first be dispersed into a solvent (e.g., water) to form a solution, and the solution may then be combined with the binding medium and granular material. Non-limiting example of solvents that can be used to form a solution with the polymer include water, non-aquatic protonic solvents (e.g., dimethylformamide, dimethylsulfoxide), $C_{1-6}$ alkanols (e.g., methanol, ethanol, 2-propanol), toluene and combinations thereof. Solutions of the various conductive polymers described herein, such as polyaniline, are commercially available from Kaken Industry Co., Ltd. and may be combined with the binding medium and granular material to obtain the mixture. In some embodiments, about 1% to about 30% by weight of the polymer is dispersed in the solvent.

In some embodiments, the polymer may be disposed in a layer on the granular material so that the polymer is dispersed in the binding medium at the same time as the granular material. For example, coated granular material (e.g., coated aggregate, such as polyaniline-coated sand) can be mixed with cement (and optionally water) within a mixer. In some embodiments, the polymer is coated on any other component that is combined with the binding medium and granular material. For example, as discussed above, the polymer can be coated upon glass fibers that are included in the composite.

Step 210 includes embedding a metal reinforcing member in the mixture. In some embodiments, the mixture can poured over the metal reinforcing so that the metal reinforcing is at least partially covered by the mixture. For example, an array of metal reinforcing bars can disposed within a region and the mixture is poured into the region to embed the metal-reinforcing member. The metal reinforcing member can be the same as those discussed above with respect to the composite.

Step 220 includes curing the mixture to form a rigid composite. Curing the mixture can include maintaining the mixture under conditions sufficient for the mixture to harden. The method of curing can vary depending, in part, upon the binding medium in the mixture. For example, if the binding medium includes hydraulic cement, the curing may include maintaining the mixture under moist conditions so that the mixture sufficiently hardens. This may be achieved, for example, by covering the mixture with a plastic sheet, or applying water to the mixture. Meanwhile, if the binding medium includes a polymer, curing may include exposing the mixture to radiation to initiate cross-linking or polymerization. In some embodiments, the curing includes maintaining the mixture within a fixed region while the mixture hardens. The fixed region may be a predetermined location where the corrosion-resistant, metal-reinforced composite will be used (e.g., a portion of land where concrete is cured to form a road).

Polymer-Coated Granular Material

Also disclosed herein are polymer-coated granular materials and methods of the making the same. The polymer-coated granular material may, for example, be included in the composites disclosed herein. Similarly, the methods of making the granular material may be included with the methods disclosed above (e.g., as an additional step before step 200 in FIG. 2) to form the composites described herein.

Figure 3B:
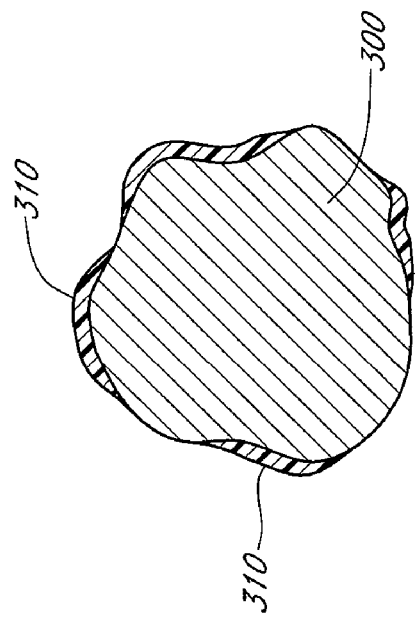
FIGS. 3A-B depict illustrative embodiments of a cross-sectional view of a polymer-coated particle that may be included within the granular material (not to scale).
Figure 3A:
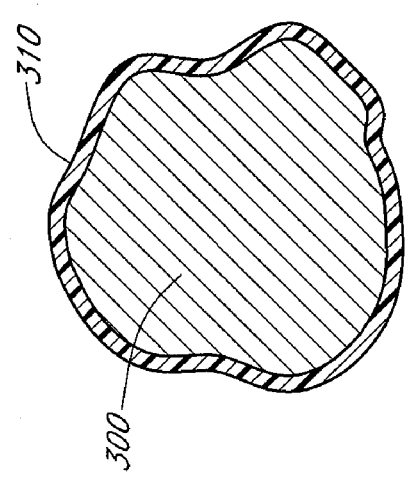

FIG. 3A shows a cross-section of one embodiment of a particle that forms part of a coated granular material. Particle 300 is coated with polymer coating 310. Polymer coating 310 covers substantially all of the surface of particle 300. FIG. 3B shows a cross-section of another embodiment of a particle that forms part of a coated granular material. Only a portion of the surface of particle 300 is coated with polymer coating 310. Although the FIGS. 3A-B each show a single particle, it will be appreciated that a plurality of particles 300 will be included in the granular material. For example, particle 300 may be a stone, and a plurality of these stones is included in gravel.

The granular material can be any of those materials described above with respect to the composite and may have any of the properties (e.g., size) as described above. In some embodiments, the granular material is aggregate. In some embodiments, the granular material is selected from sand, gravel, stone, crushed stone, iron blast-furnace slag, and combinations thereof.

Similarly, the polymer may be any of those polymers discussed above with respect to the composites. In some embodiments, the polymer has a recurring unit having a π-conjugated electron system. Non-limiting examples of polymers include polyaniline, polyoxyphenylene, polyphenylene sulfide, polythiophene, polyfuran, polypyrrole, polymethylpyrrole, polycarbozole, polyazulene, and copolymers thereof.

The amount of the polymer relative to the granular material is not limited, but may generally be between about 0.001% to about 35% by weight. The amount of the polymer relative to the granular material may, for example, be at least about 0.001% by weight, at least about 0.01% by weight, at least about 0.1% by weight, at least about 1% by weight, at least about 2% by weight, or at least about 5% weight. The amount of the polymer relative to the granular material may, for example, be no more than about 35% by weight, no more than about 25% by weight, no more than about 15% by weight, no more than about 10% by weight, no more than about 5% by weight, no more than 1% by weight, no more than 0.5% by weight, or no more than 0.2% by weight.

In some embodiments, the polymer-coated granular material may be formed by applying a solution containing the polymer on to the granular material. For example, an aqueous solution having the polymer (e.g., polyaniline) dispersed therein may be applied to the granular material. The solution may be applied by spraying, dipping, mixing, and the like. Any method that contacts the solution with the granular material such that the polymer remains on the granular material is sufficient. Examples of solvents that may be used in the solution include, but are not limited to, water, non-aquatic protonic solvents (e.g., dimethylformamide, dimethylsulfoxide), $C_{1-6}$ alkanols (e.g., methanol, ethanol, 2-propanol), toluene and combinations thereof. In some embodiments, about 1% to about 30% by weight of the polymer is dispersed in the solvent. The solution may, in some embodiments, initially have a low pH. For example, pH can be no more than 5, no more than 3, or no more than 1. After combining the polymer and aggregate in the solution, the pH may, in some embodiment, be raised to a pH sufficient to precipitate the polymer onto the aggregate. For example, the pH may raised to about 7 by adding an oxidizing agent, such as ammonium persulfate or potassium persulfate, to precipitate the polymer onto the aggregate.

Figure 4:
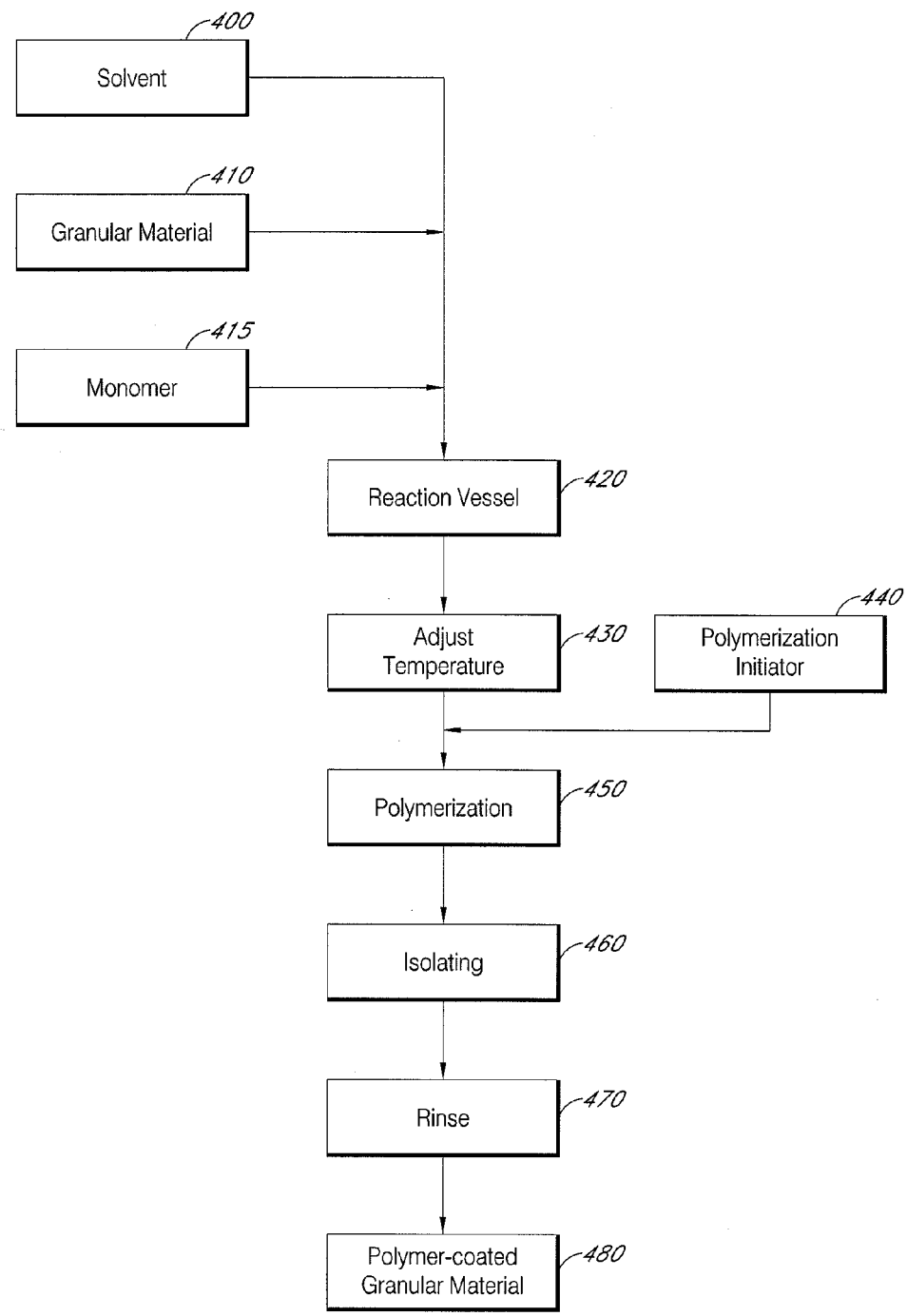
FIG. 4 depicts an illustrative embodiment of a method of applying polymer to granular material that is within the scope of the present application.

FIG. 4 shows one embodiment of a method for applying the polymer to the granular material. Solvent 400, such as ion-exchanged water, granular material 410, and monomer 415 are disposed in reaction vessel 420. This technology permits high amounts of granular material and solvent, which can allow high volume production of polymer-coated granular material. For example, the granular material may occupy up to 60% of the volume of the reaction vessel and the combined amount of granular material and solvent may occupy up to 80% of the volume of the reaction vessel. The monomer unit can be selected based on the desired polymer, and may include, for example, aniline, thiophene, pyrrole, and the like, to form the polymers disclosed above. The monomer may, in some embodiments, be included at a concentration in the range of about 0.1 M to 2 M. The relative amount of granular material to monomer by weight may, in some embodiments, be at least about 1:1, at least about 1.5:1, or at least about 2:1.

The components in the reaction vessel can optionally be adjusted to a desired temperature (e.g., cooled below about 20° C. or below about 10° C.) at step 430. The pH may optionally be adjusted (e.g., a pH below about 4 or below about 2). A polymerization initiator can be added to the reaction vessel, preferably while agitating the components, at step 440. In some embodiments, the polymerization initiator is an oxidizing agent, such an alkali persulfate (e.g., potassium persulfate and ammonium persulfate), chlorine dioxide, hydrogen peroxide, acetyl hydroperoxide, and azobisisobutyronitrial. The oxidizing agent may be included at a concentration in the range of about 0.05 M to about 1 M. A neutral surfactant, such as polyethylene glycol, or anionic surfactant, such as an alkylsulfonate salt, may be included to aid polymer formation on the aggregate surface.

The monomer units may then be polymerized at step 450, which can form the polymer on the granular material. The polymer-coated granular material may then be optionally isolated from the reactant (e.g., filtered) at step 460. The polymer-coated granular mater may be optionally rinsed at step 470. The rinsing can include exposing the polymer-coated granular material to a base to neutralize the polymer. In some embodiments, the amount of exposure to base (e.g., exposure time and base concentration) is effective to neutralize the polymer. In some embodiment, the polymer is not doped after exposure to the base (e.g., the conductive polymer is not conductive). In some embodiments, the polymer is polyaniline and the exposure to base is sufficient to obtain an emeraldine-base polyaniline.

The method yields the polymer-coated granular material 480. The polymer-coated granular material may optionally be combined with binding medium (e.g., as depicted in step 200 in FIG. 2) and processed as disclosed above to form the composites disclosed herein.

Figure 5:
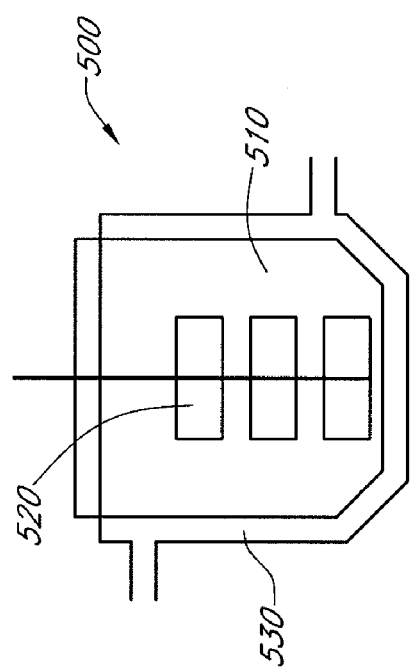
FIG. 5 depicts an illustrative embodiment of a reaction vessel that can be used in the method of applying polymer to granular material that is within the scope of the present application (not to scale).

FIG. 5 is one example of a reaction vessel that may be used to apply the polymer to the granular material. Reaction vessel 500 includes components 510 for completing the polymerization reaction. For example, the components can include monomer, solvent, polymerization initiator, and the granular material. Agitating blades 520 may be used to agitate the components during the reaction. Channel 530 may be used to circulate a fluid around the outside of components 510 to controls the temperature of components 510. For example, channel 530 may be coupled to a chiller unit (not shown) that maintains fluid at or below a desired temperature to cool components 510 during the reaction.

As disclosed above with respect to the composites, fibers may be included in the composition. As would be appreciated by the skilled artisan, guided by the teaching of the present application, the methods for coating the granular material can also be applied to fibers. Thus, for example, fibers may be included in the reaction vessel as an alternative or in addition to the granular material during polymerization to form polymer-coated fibers. Accordingly, the methods of the present application also include applying the polymer to a fiber. And these polymer-coated fibers may be included in the method for making the composites. For example, polymer-coated fibers can be combined with granular material and binding medium at step 200 in FIG. 2.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

EXAMPLES

Additional embodiments are disclosed in further detail in the following examples, which are not in any way intended to limit the scope of the claims.

Example 1

Steel-reinforced concrete is prepared having 30% of the total aggregate being polyaniline-coated aggregate. About 20% by volume of coarse and fine aggregate is dispersed in an aqueous hydrochloric acid solution having a pH below 1. About 1 M of polyaniline is dispersed into the solution and the solution is cooled to below 10° C. An 0.4 M solution of ammonium persulfate is then added in sufficient amounts to precipitate the polyaniline from solution. The aggregate is then filtered and washed to form the polyaniline-coated aggregate.

The mixture was prepared using a standard concrete mixer. The mixture included river sand (2.61 g/cm$^3$ density, fineness modulus of 2.70) as fine aggregate, crushed rock (2.60 g/cm$^3$ density) as coarse aggregate, Portland cement. and an air-entraining agent (AE agent). The mixture exhibited a slump of about 10 cm determined using standard techniques. The air volume was determined to about 5% air using standard air meter testing equipment. The components are shown in TABLE 1.

The mixture was poured over and embedded a rebar structure and hardened to form steel-reinforced concrete.

TABLE 1

| Maximum size of coarse aggregate (mm) | Slump (cm) | Water-cement ratio (%) | Air volume (%) | Fine aggregate ratio (%) | Unit volume (kg/m$^3$) | | | | Admixture (kg/m$^3$) |
|---|---|---|---|---|---|---|---|---|---|
| | | | | | Water (W) | Cement (C) | Fine aggregate (S) | Coarse aggregate (G) | AE water-reducing agent |
| 25 | 10 | 54 | 5.0 | 41.0 | 174 | 322 | 721 | 1034 | 0.322 |
| Proportion of polyaniline-coated aggregate | | | | | | | 216 | 310 | |

Example 2

Steel-reinforced concrete is prepared according to the same procedures described in Example 1 except that the aggregate is not coated with polyaniline. About 1% by weight of polyaniline-coated glass fibers is included in the mixture.

19

The fibers are chopped to about 2 cm in length. The polyaniline-coated glass fibers are prepared using generally the same techniques as in Example 1 for preparing the coated aggregate.

Example 3

Steel-reinforced concrete is prepared according to the same procedures described in Example 1 except that the aggregate is not coated with polyaniline. About 4% by weight of free polyaniline (i.e., not coated on any particular component) is included in the mixture.

Example 4

The concrete composition of Example 1 is used to form a bridge piling. A suitable hole is bored to reach a supporting layer. A rebar structure is then inserted into the hole and embedded in the concrete composition. Finally, the concrete composition is hardened to produce the bridging pile. It is expected that the bridge piling exhibits improved corrosion resistance.

What is claimed is:

1. A corrosion-resistant, metal-reinforced composite comprising:
    a binding medium, wherein the binding medium comprises cement;
    a granular material dispersed within the binding medium, wherein the granular material is aggregate;
    a polymer dispersed within the binding medium, wherein the polymer comprises a recurring unit having a π-conjugated electron system; and
    a metal reinforcing member embedded within the binding medium,
    wherein the metal-reinforcing member is not coated with any polymer that inhibits corrosion.

2. The composite of claim 1, wherein the polymer is configured to be electrically conductive when doped with an effective amount of dopant.

3. The composite of claim 2, wherein the dopant is a hydrochloride.

4. The composite of claim 2, where the polymer is configured to have an electrical conductivity of at least $10^{-2}$ S·cm$^{-1}$ when doped with an effective amount of dopant.

5. The composite of claim 2, wherein the polymer is not doped.

6. The composite of claim 1, wherein the recurring unit is selected from the group consisting of:

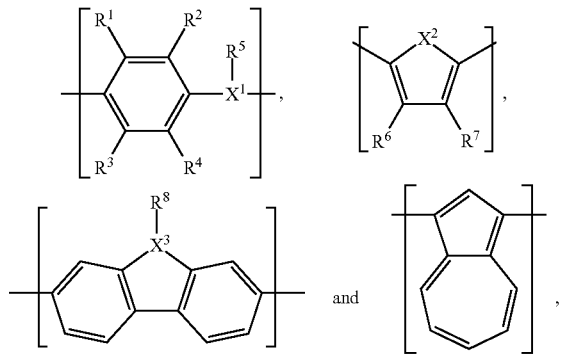

and

20 wherein:
    $X^1$, $X^2$ and $X^3$ are each independently selected from the group consisting of O, S, and N;
    $R^1$ and $R^2$, are each independently selected from the group consisting of hydrogen, $C_{1-6}$ alkyl and $C_{1-6}$ alkoxy, or $R^1$ and $R^2$ are taken together to form a cycloalkyl, aryl or heterocycle;
    $R^3$ and $R^4$ are each independently selected from the group consisting of hydrogen, $C_{1-6}$ alkyl and $C_{1-6}$ alkoxy, or $R^3$ and $R^4$ are taken together to form a cycloalkyl, aryl or heterocycle;
    $R^5$ is absent or selected from the group consisting of hydrogen and $C_{1-6}$ alkyl;
    $R^6$ and $R^7$ are each independently selected from the group consisting of hydrogen, $C_{1-6}$ alkyl and $C_{1-6}$ alkoxy, or $R^6$ and $R^7$ are taken together to form a cycloalkyl, aryl or heterocycle; and
    $R^8$ is absent or selected from the group consisting of hydrogen and $C_{1-6}$ alkyl.

7. The composite of claim 1, wherein the polymer is selected from the group consisting of polyaniline, polyoxyphenylene, polyphenylene sulfide, polythiophene, polyfuran, polypyrrole, polymethylpyrrole, polycarbozole, polyazulene, and copolymers thereof.

8. The composite of claim 1, wherein the composite comprises at least 0.001% of the polymer by weight.

9. The composite of claim 1, wherein the composite comprises no more than about 35% of the polymer by weight.

10. A corrosion-resistant, metal-reinforced composite comprising:
    a binding medium, wherein the binding medium comprises cement;
    a granular material dispersed within the binding medium wherein the granular material is aggregate;
    a polymer dispersed within the binding medium, wherein the polymer comprises a recurring unit having a π-conjugated electron system; and
    a metal reinforcing member embedded within the binding medium,
    wherein the polymer is coated on at least a portion of the granular material dispersed within the binding medium.

11. The composite of claim 10, wherein the polymer coating on at least a portion of the granular material is about 20 µm to about 200 µm thick.

12. The composite of claim 1, wherein the polymer is a powder.

13. The composite of claim 1, wherein the composite comprises at least about 4% of the binding medium by weight.

14. The composite of claim 1, wherein the composite comprises no more than about 50% of the binding medium by weight.

15. The composite of claim 1, wherein the composite comprises at least about 40% of the granular material by weight.

16. The composite of claim 1, wherein the composite comprises no more than about 90% of the granular material by weight.

17. The composite of claim 1, wherein the granular material comprises at least about 10% by weight of a first material that is retained by a 4.75-mm sieve.

18. The composite of claim 1, wherein the granular material comprises at least about 10% by weight of a second material that passes through a 4.75-mm sieve.

19. The composite of claim 1, wherein the granular material is selected from the group consisting of sand, gravel, stone, crushed stone, iron blast-furnace slag, and combinations thereof.

20. The composite of claim 1, wherein the metal reinforcing member is configured to carry tensile loads within the composite.

21. The composite of claim 1, wherein the metal reinforcing member comprises a plurality of metal bars having diameters of at least about 4 mm.

22. The composite of claim 21, wherein the metal bars are at least about 25 cm long.

23. The composite of claim 21, wherein the metal bars comprise a plurality of ridges along a surface of the metal bars.

24. The composite of claim 1, wherein the metal reinforcing member is steel or stainless steel.

25. The composite of claim 1, wherein the composite further comprises fibers.

26. The composite of claim 25, wherein at least of a portion of the fibers are coated with the polymer.

27. A composite prepared according to a method comprising:
    combining a binding medium, a granular material, and a polymer to form a mixture, wherein the binding medium is cement and the granular material is aggregate;
    embedding a metal reinforcing member within the mixture; and
    curing the mixture to form a rigid composite, wherein the polymer comprises a recurring unit having a π-conjugated electron system.

28. The composite of claim 27, wherein the recurring unit is selected from the group consisting of:

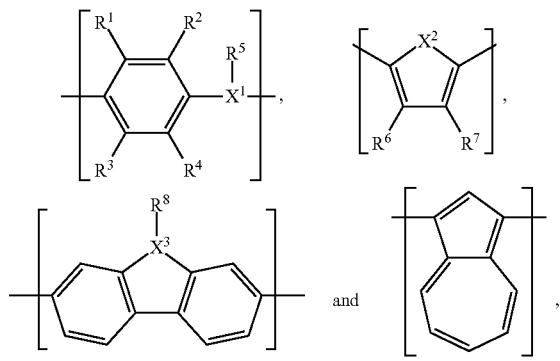

wherein:
   $X^1$, $X^2$ and $X^3$ are each independently selected from the group consisting of O, S, and N;
   $R^1$ and $R^2$, are each independently selected from the group consisting of hydrogen, $C_{1-6}$ alkyl and $C_{1-6}$ alkoxy, or $R^1$ and $R^2$ are taken together to form a cycloalkyl, aryl or heterocycle;
   $R^3$ and $R^4$ are each independently selected from the group consisting of hydrogen, $C_{1-6}$ alkyl and $C_{1-6}$ alkoxy, or $R^3$ and $R^4$ are taken together to form a cycloalkyl, aryl or heterocycle;
   $R^5$ is absent or selected from the group consisting of hydrogen and $C_{1-6}$ alkyl;
   $R^6$ and $R^7$ are each independently selected from the group consisting of hydrogen, $C_{1-6}$ alkyl and $C_{1-6}$ alkoxy, or $R^6$ and $R^7$ are taken together to form a cycloalkyl, aryl or heterocycle; and
   $R^8$ is absent or selected from the group consisting of hydrogen and $C_{1-6}$ alkyl.

29. The composite of claim 27, wherein the polymer is selected from the group consisting of polyaniline, polyoxyphenylene, polyphenylene sulfide, polythiophene, polyfuran, polypyrrole, polymethylpyrrole, polycarbozole, polyazulene, and copolymers thereof.

30. The composite of claim 27, wherein the combining further comprises combining water with the granular material, the binding medium, and the polymer.

31. The method of claim 30, wherein the polymer is combined with the water before combining with the granular material and the binding medium.

32. The composite of claim 27, wherein the polymer is applied on at least a portion of the granular material before combining with the binding medium.

33. The composite of claim 32, wherein the polymer is applied to form a layer about 20 μm to about 200 μm thick on at least a portion of the granular material.

34. The composite of claim 1, wherein the granular material and polymer are intermixed within the binding medium.

35. The composite of claim 10, wherein the polymer is configured to be electrically conductive when doped with an effective amount of dopant.

36. The composite of claim 10, wherein the polymer is selected from the group consisting of polyaniline, polyoxyphenylene, polyphenylene sulfide, polythiophene, polyfuran, polypyrrole, polymethylpyrrole, polycarbozole, polyazulene, and copolymers thereof.

37. A method of making a corrosion-resistant, metal-reinforced composite, the method comprising:
    combining a binding medium, a granular material, and a polymer to form a mixture, wherein the binding medium is cement and the granular material is aggregate;
    embedding a metal reinforcing member within the mixture; and
    curing the mixture to form a rigid composite, wherein the polymer comprises a recurring unit having a π-conjugated electron system.

38. The method of claim 37, wherein the recurring unit is selected from the group consisting of:

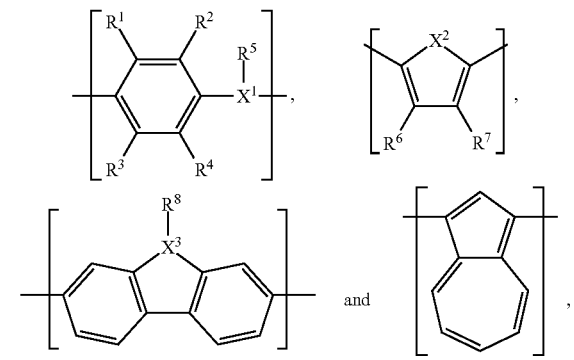

wherein:
   $X^1$, $X^2$ and $X^3$ are each independently selected from the group consisting of O, S, and N;
   $R^1$ and $R^2$, are each independently selected from the group consisting of hydrogen, $C_{1-6}$ alkyl and $C_{1-6}$ alkoxy, or $R^1$ and $R^2$ are taken together to form a cycloalkyl, aryl or heterocycle;
   $R^3$ and $R^4$ are each independently selected from the group consisting of hydrogen, $C_{1-6}$ alkyl and $C_{1-6}$ alkoxy, or $R^3$ and $R^4$ are taken together to form a cycloalkyl, aryl or heterocycle;
   $R^5$ is absent or selected from the group consisting of hydrogen and $C_{1-6}$ alkyl;

R⁶ and R⁷ are each independently selected from the group consisting of hydrogen, $C_{1-6}$ alkyl and $C_{1-6}$ alkoxy, or R⁶ and R⁷ are taken together to form a cycloalkyl, aryl or heterocycle; and R⁸ is absent or selected from the group consisting of hydrogen and $C_{1-6}$ alkyl.

39. The method of claim 37, wherein the polymer is selected from the group consisting of polyaniline, polyoxyphenylene, polyphenylene sulfide, polythiophene, polyfuran, polypyrrole, polymethylpyrrole, polycarbozole, polyazulene, and copolymers thereof.

40. The method of claim 37, wherein the combining further comprises combining water with the granular material, the binding medium, and the polymer.

41. The method of claim 40, wherein the polymer is combined with the water before combining with the granular material and the binding medium.

42. The method of claim 37, wherein the polymer is applied on at least a portion of the granular material before combining with the binding medium.

43. The method of claim 42, wherein the polymer is applied to form a layer about 20 μm to about 200 μm thick on at least a portion of the granular material.

* * * * *

UNITED STATES PATENT AND TRADEMARK OFFICE
CERTIFICATE OF CORRECTION

PATENT NO. : 8,288,459 B2
APPLICATION NO. : 13/126155
DATED : October 16, 2012
INVENTOR(S) : Iwamoto Page 1 of 2

It is certified that error appears in the above-identified patent and that said Letters Patent is hereby corrected as shown below:

On Title Page 2, in Item (56), under "OTHER PUBLICATIONS", in Column 1, Line 1, delete "rusting..."" and insert -- rusting...," --, therefor.

On Title Page 2, in Item (56), under "OTHER PUBLICATIONS", in Column 2, Line 5, delete "Polymers"" and insert -- Polymers," --, therefor.

In the Specifications:

In Column 1, Line 59, delete "n-conjugated" and insert -- π-conjugated --, therefor.

In Column 2, Lines 5-11, delete " 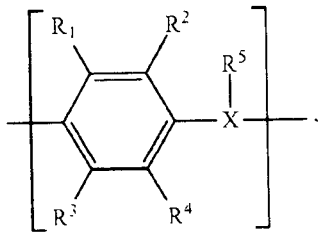 " and insert

-- 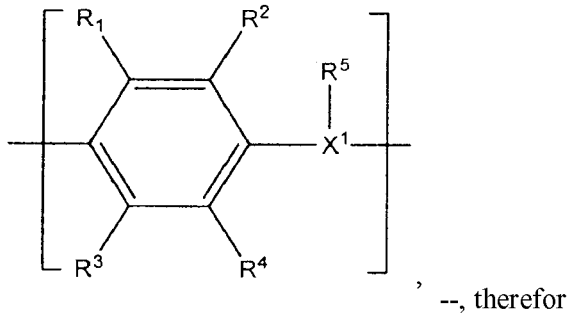 --, therefor.

In Column 3, Line 15, delete "at least of a portion" and insert -- at least a portion --, therefor.

Signed and Sealed this
Ninth Day of July, 2013

Teresa Stanek Rea
*Acting Director of the United States Patent and Trademark Office*

CERTIFICATE OF CORRECTION (continued)
U.S. Pat. No. 8,288,459 B2

In Column 4, Line 17, delete "n-conjugated" and insert -- π-conjugated --, therefor.

In Column 4, Line 24, delete "n-conjugated" and insert -- π-conjugated --, therefor.

In Column 5, Line 29, delete "2-methypropyl," and insert -- 2-methylpropyl, --, therefor.

In Column 7, Line 48, delete "bout" and insert -- about --, therefor.

In Column 9, Line 47, delete "$10^{-3}$" and insert -- $10^{-3}$ S·cm$^{-1}$, --, therefor.

In Column 10, Line 37, delete "n-conjugated" and insert -- π-conjugated --, therefor.

In Column 18, Line 42, delete "cement." and insert -- cement, --, therefor.

In the Claims:

In Column 19, Line 43, in Claim 4, delete "where" and insert -- wherein --, therefor.

In Column 20, Line 34, in Claim 10, delete "medium" and insert -- medium, --, therefor.

In Column 21, Line 16, in Claim 26, delete "at least of a portion" and insert -- at least a portion --, therefor.